F. C. PHILIPS.
FRUIT PITTING AND CUTTING MACHINE.
APPLICATION FILED MAY 18, 1914.

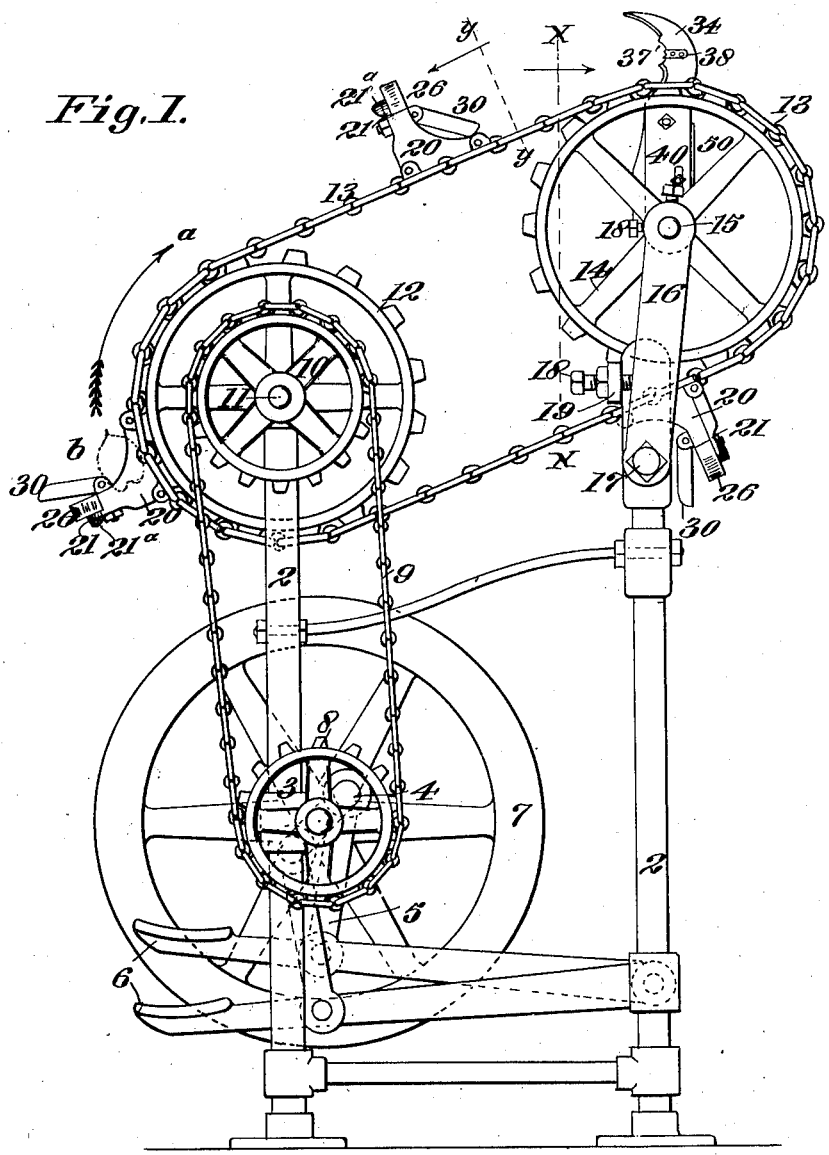
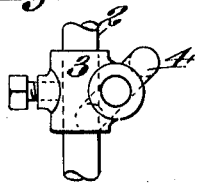

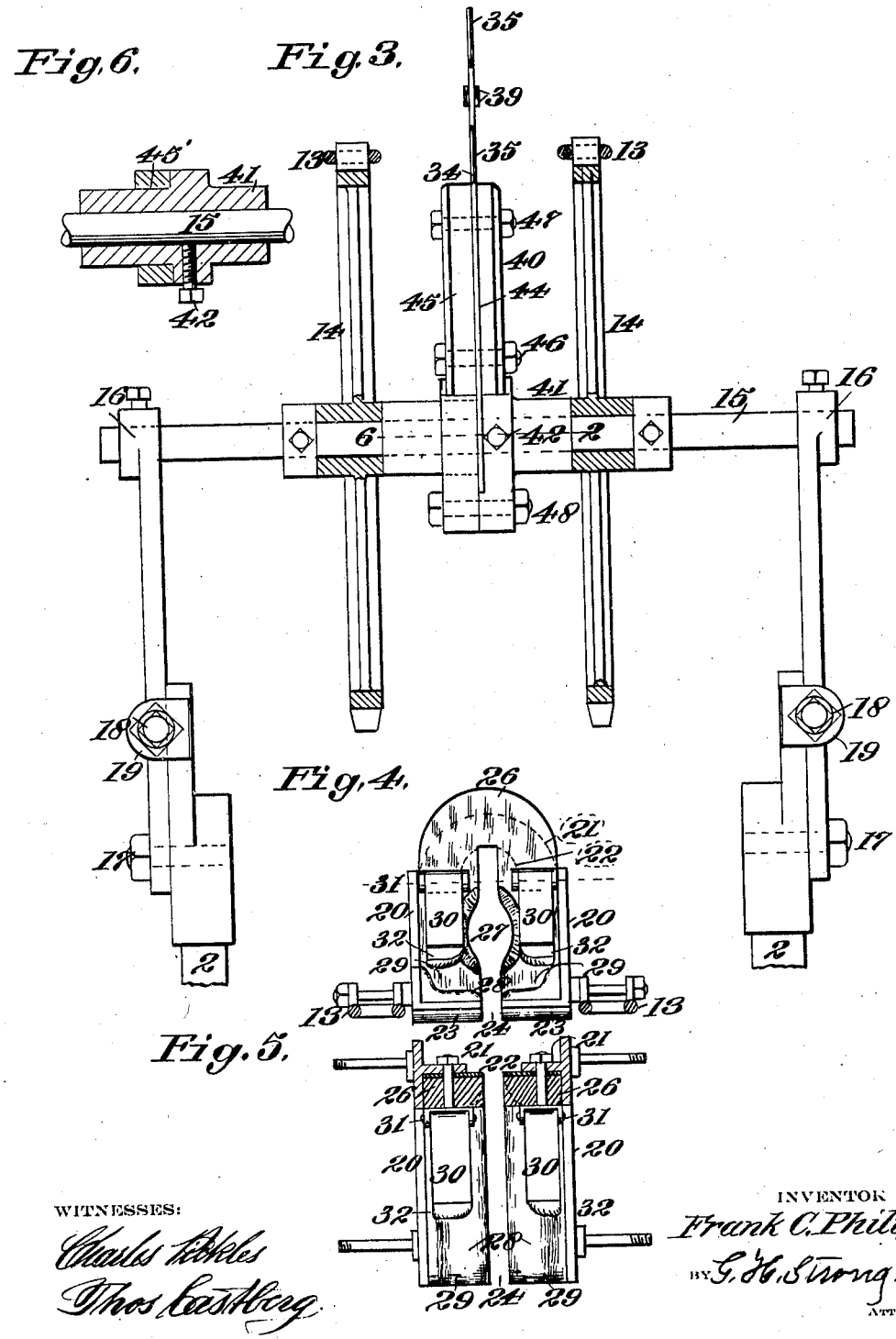

1,112,090.

Patented Sept. 29, 1914.
3 SHEETS—SHEET 3.

WITNESSES:
Charles Pickles
Thos Eastberg

INVENTOR
Frank C. Philips.
BY G. H. Strong
ATTORNEY

UNITED STATES PATENT OFFICE.

FRANK CUTTER PHILIPS, OF HEALDSBURG, CALIFORNIA.

FRUIT PITTING AND CUTTING MACHINE.

1,112,090.  Specification of Letters Patent.  Patented Sept. 29, 1914.

Application filed May 18, 1914. Serial No. 839,269.

*To all whom it may concern:*

Be it known that I, FRANK CUTTER PHILIPS, a citizen of the United States, residing at Healdsburg, in the county of Sonoma and State of California, have invented new and useful Improvements in Fruit Pitting and Cutting Machines, of which the following is a specification.

This invention relates to improvements in an apparatus for pitting and cutting fruits.

It is an object of the present invention to provide means for facilitating the pitting and cutting of various fruits, and particularly to provide improvements in details of construction, whereby the present machine may handle rapidly and without undue mutilation, fruits of various kinds and degrees of ripeness.

It is a particular object of the present invention to provide a machine of substantial and light construction, and yet which may be easily operated by manual or other power.

The invention consists of the parts and the construction and combination of parts as hereinafter more fully described, having reference to the accompanying drawings, in which—

Figure 7:
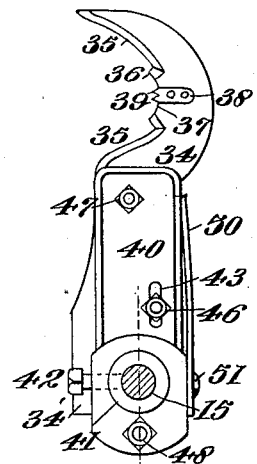
Figure 9:
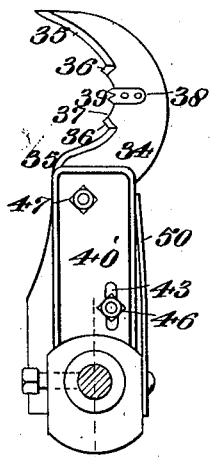
Figure 11:
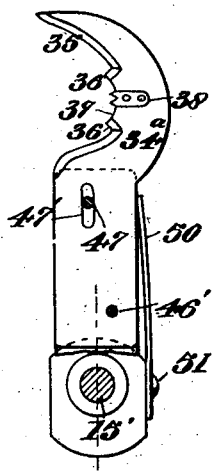
Figure 8:
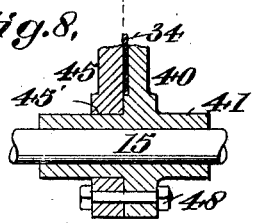
Figure 10:
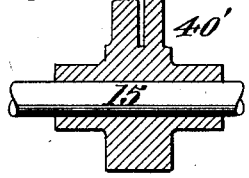
Figure 12:
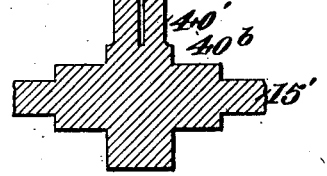
Figure 13:
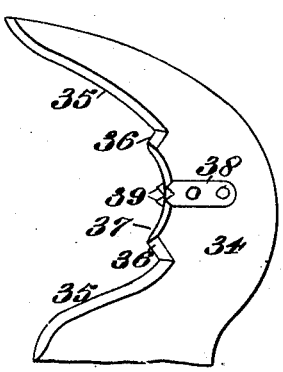
Figure 14:
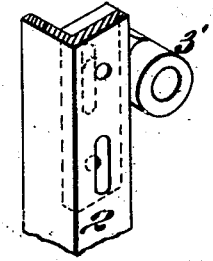

Figure 1 is a side elevation of the improved machine. Fig. 2 is a detail view showing the crank-shaft hanger. Fig. 3 is detail section, line X—X, Fig. 1. Fig. 4 is a section on line Y—Y, Fig. 1. Fig. 5 is a plan view thereof partly broken away in the plane of the fastening screws. Fig. 6 is a sectional detail on line 2—2, Fig. 3. Figs. 7 and 8 are respectively a side elevation and an axial section of the stationary cutter and a clamp therefor. Figs. 9 and 10 are respectively a side elevation and an axial section of the stationary cutter and a modified form of clamp. Figs. 11 and 12 are respectively a side elevation partly in section, and an axial section of a form of stationary cutter and another modified form of cutter clamp. Fig. 13 is a perspective of the upper cutter portion of the stationary cutter. Fig. 14 is a detail view showing a form of mounting for the crank shaft as applied to a frame, consisting of angle iron members.

2 is a frame built of standard pipe members or other inexpensive material, such as angle iron, a section of which is illustrated in Fig. 14. Attached to the uprights or legs of the frame are suitable journals or hangers 3, axially arranged and carrying a shaft 4, which may be operated through any suitable source of power, the shaft 4 here being shown as a crank-shaft connected by connecting links 5 with suitable foot-pedals 6, whereby the machine may be operated manually. Upon one end of the shaft 4 is secured a momentum, or fly-wheel 7, and upon the opposite end is secured a sprocket pinion 8 to drive a sprocket chain 9, which in turn drives an upper sprocket wheel 10, secured upon a countershaft 11, mounted in appropriate journals on the upper portion of the frame 2. Secured upon the countershaft 11 are a pair of driving sprockets 12 over which run a pair of parallel sprocket chains 13—13, running upwardly and forwardly in the direction of the arrow $a$, Fig. 1, to idler sprockets 14—14, loosely mounted upon a head-shaft 15, secured against rotation in journals at the upper end bearings 16, which are in the form of levers pivoted at their lower ends at 17 upon suitable mountings or parts of frame 2. The bearing members are pivotally mounted upon the frame for the purpose of providing means for tensioning the sprocket chains 13; the tension of the latter being obtained by a suitable tightening means comprising screws 18, mounted upon ears 19, or other suitable portions of, or on the frame 2, in such a position that the inner ends of the screws 18 engage and react upon the bearing members 16, so that by turning the screws 18 through their bearings 19 they may move against the members 16, and turn the same about their pivots 17 to produce the desired tension of the chains 13.

Suitably connected and between, and carried by the sprocket chains 13, are devices upon which the fruit to be severed and pitted may be deposited by any suitable means, as the devices move upwardly around the lower end of the sprocket chains 13, as they come around the driving wheels 12. This carrying device, in the present instance, comprises an arched casting, or otherwise formed support, clearly shown in Figs. 4 and 5, at 20; the support having a perpendicularly arched back 21, centrally slotted for nearly its entire length, as at 22, and having transverse, angle bottom flanges 23, which are separated and of sufficient distance between their inner edges to form a passageway 24 in the plane of the vertical slot in the back 21.

Detachably mounted to the front of the back 21 of the carrier is a pad or cushioning member 26 which may be of rubber to protect soft fruit, and which has a central, longitudinal aperture 27, here shown as of less width than the aperture 22 of the back 21; and secured to the forwardly projecting flanges, or bottom members 23 of the support, are other cushion pads 28 of rubber or other suitable material, which are substantially concaved as at 29 on their upper surface, and formed in coöperation with the rear pad or cushion 26 is an angular member, or seat wherein the fruit to be severed is deposited either by the operator or from any suitable feeding means, preferably with the stem end of the fruit facing the back of the pocket, as at b, Fig. 1, and with the crease of the fruit preferably lying in the slots 24 and 27 of the carrier parts when one of the carriers starts its upward movement around the driving sprocket 12.

One of the improvements of the present invention comprises means connected to the carriers for aiding in holding the fruit in position upon the cushion 26—29, as the carriers pass over the top of the sprocket wheels 12, and move along with the upper stretch of the conveyer chains 13, this means comprising in the present instance, a pair of independently mounted presser-fingers 30, pivoted respectively at 31 in front of a pad 26 of a carrier; the fingers projecting forwardly and being free to gravitate down upon a fruit which has been deposited in the pocket of a carrier; these fingers 30 being provided with cushions, or pads 32, adapted to rest upon the fruit and protect it against injury and hold it steadily, as stated, during the traverse of a carrier upwardly with chains 13.

I prefer that the back cushion 26 be of somewhat greater length than the back blade 21 of the support or carrier 20, as indicated in Figs. 1 and 4, so as to avoid the danger of injury to an operator's hand by engagement with the rigid metal back 21; and I prefer that the back blade 21 also be reinforced with a rib or flange 21ᵃ for strengthening the arch where it joins the side arms of the back which are spaced to provide the slot, or aperture 22.

A further important improvement in the present invention is the structure of and the mounting for a stationary abutment and cutting member which coöperates with each moving carrier 20 to divide a fruit in the carrier and remove the pit from the divided section. This abutment member is shown clearly in Figs. 7 and 9, as comprising a steel cutter or blade 34 of suitable thickness and strength; the upper end of the cutter being provided with a sickle shaped blade, the concaved edge of which is sharpened at the arcuate portions 35 and at the angular or radial portions 36 which intersect a central, arcuate edge 37, which has not been sharpened, but left flat in the plane of the thickness of the blade 34; there being secured upon opposite sides, and central of the blade 34, a set of prong members 38, clearly shown in Fig. 13, provided with points 39 between which, and against the flat edge 37 of the blade 34, the sharp point of a fruit pit will impinge as it is carried toward the stationary cutter 34; the opposite prongs or points 39 serving to prevent the end of the pit from slipping off of the flat edge 37 of the abutment member. The abutment and cutter member 34 is provided with a straight shank portion mounted in a suitable clamp, which in Figs. 7 and 8 is shown as comprising a side member 40, with a hub 41 secured upon the upper forward stationary shaft 15, and clamped thereto by suitable fastening means shown as a set-screw 42, Figs. 6 and 7. The perpendicular side 40 of the clamp is slotted as at 43, and recessed as at 44, Fig. 8, to form a seat for the shank or the blade 34 upon the opposite side of which is applied a complementary side member 45 of the clamp, Figs. 3 and 8, through which assembled parts the side 40, the shank of the blade 34 and the side jaw 45, there may be passed a fastening bolt 46, shown as passing through slot 43 of the clamp blade 40, Fig. 7, and when it is desired to clamp the abutment blade 34 rigidly in the clamp devices 40—45 another fastening screw 47 may be passed through the clamp blades to bind them together on the inserted abutment blade 34. The detachable blade clamp 45 is provided at its lower end with an aperture 45′ for the reception of the adjacent hub portion formed integrally with the main clamp body 40, the detachable clamp jaw 45 being secured to the clamp member 40 by a fastening bolt 48, Fig. 8.

For the purpose of permitting the yielding movement of the upper cutting end of the abutment blade 34, as would be desirable while cutting soft fruit in the machine, upper fastening bolt 47 may be eliminated, thus allowing the cutter blade 34 to pivot on the lower fastening bolt 46, projecting through the slot 43 of the clamp member 40, and which slot allows radial adjustment of the blade 34 as may be desired. When the abutment member 34 is mounted for play in the clamp 40, it is preferable that there be provided means for limiting the forward movement of the cutter and which is shown in the present instance as an overhanging horn 34′ on the lower forward corner of the cutter blade 34; this being adapted to swing against the adjacent surface of the clamp and stop further forward movement. A further purpose of the horn or extension 34' is to keep the knife in a perpendicular position when raised higher than the bottom of the slot 44 and in contact with the spring at the back; otherwise, the knife would drop forward at the top and be out of position. The cutter 34, when pivoted on the bolt 46, is normally thrown forward by a spring 50, the upper end of which is engageable with the rear edge of the cutter 34, the spring being secured at its lower end by a suitable means, as a screw or other fastening means 51, so that when the machine is in operation and a fruit to be pitted and severed is carried upwardly by one of the carriers, when the fruit engages the cutting edges of the blade 34, the latter will yield against its reaction and supporting spring 50 until the resistance of the spring 50 becomes sufficient to stop further yielding movement of the cutter blade 34; whereupon the pit will rest against the edge of the cutter 34, and the carrier force the fruit in its pocket across the cutter so that the fruit will be divided, and the pit which remains held against the blade 34 will be ejected through the central opening 27 in the back cushion 26; the severed fruit sections being carried around by the carrier until they fall forwardly out of the latter as this turns downwardly about the upper idler sprockets 14, while the pit will fall from its support against the front edge of the abutment member 34. When the machine is operating upon very firm or hard fruit, then it may be desirable to lock the abutment and cutter member 34 against yielding movement by the insertion and tightening up of the upper fastening bolt 47.

The modified form of abutment and cutting blade is shown in Fig. 11, in which the horn or prong 34' is eliminated, and the forward tilting movement of the modified cutter blade 34ª is prevented by coöperation of the forward lower corner of this blade with the contiguous relatively stationary part on, or of the clamp.

I have shown three types or forms of clamps for the abutment and cutting blade, one of which has been described and shown in Fig. 8, as consisting of separable clamp jaws 40—45 which are adjustable upon the upper forward sprocket shaft 15. In Figs. 9 and 10 the clamp 40' is shown as consisting of an integral block with a perforated hub portion and having a slot 44' therein for the reception of the cutter blade 34; the blade fastening means comprising bolts, as 46—47, of Fig. 7, while in Figs. 11 and 12, the modification is disclosed as a clamp 40ᵇ in which the shaft 15' is formed integrally as a portion of the clamp body which is provided with the blade-receiving slot 40', as in Fig. 10. The cutter blades 34 are provided with upper slots 47' for the reception of the fastening bolts 47 which slidably pass through circular apertures formed in the opposite clamp jaws, while the aperture in the blade 34 or 34ª through which the lower bolt 47 passes is preferably round as shown in Fig. 11, so that while the bolt 46 may be shifted longitudinally in the slot 43 of the clamp jaws, the blade will be lifted upwardly or downwardly according to the movement of the bolt.

In Fig. 14 there is shown a modified form of bearing members 3' which are adjustable upon the uprights of the frame 2 when the latter is of angle iron form, as shown in this figure.

I have found that by placing fruit, indicated at $b$, Fig. 1, with the stem end down in the carrier that the pit will be ejected from the fruit with the least destructive effect to the pieces, for the reason that the pit occupies a position close to the surface of the fruit at the stem end.

It is understood that the machine may be utilized for preparing fruit for drying purposes by dividing the fruit into a plurality of sections, as halves or quarters, and pitting or coring when necessary, and may be used for cutting seed potatoes for planting. Soft or peeled fruit is prevented from being mashed or bruised in the cups by the coöperation of the yielding cup cushions and the yieldably supported knife.

The machine may be fed with facility by placing on opposite sides of the feed end suitable tables or feed hoppers down which the fruit or vegetables being handled would be brought close to right and left hands of operator, and enable him to feed the machine alternately with each hand.

Having thus described my invention, what I claim and desire to secure by Letters Patent is:

1. In a fruit pitting machine, a pair of parallel, spaced chains, a driving mechanism therefor and carriers fixed upon and between said chains and moving therewith, each having a pocket for the reception of fruit, a relatively stationary cutter and abutment member mounted in the path of movement of said pockets so as to divide the fruit carried in the pockets as they pass the abutment member, and presser fingers connected to said carriers for embracing the fruit placed in the pocket of the carriers to steady the same in its position therein.

2. In a fruit pitting machine, a pair of parallel, spaced sprocket chains, a driving mechanism therefor and carriers fixed upon and between said chains and moving therewith, each having a pocket for the reception of fruit, a relatively stationary cutter and abutment member mounted in the path of movement of said pockets so as to divide the fruit carried in the pockets as they pass the abutment member, and presser fingers connected to said carriers for embracing the fruit placed in the pocket of the carriers to steady the same in its position therein, said presser fingers automatically falling into engaging position with a fruit inserted in a pocket in a carrier during movement of the carrier and automatically operating to release the severed fruit sections in the carrier after the same has passed the cutting member.

3. In a fruit pitting machine, a pair of parallel, spaced sprocket chains, a driving mechanism therefor and carriers fixed upon and between said chains and moving therewith, each having a pocket for the reception of fruit, a relatively stationary cutter and abutment member mounted in the path of movement of said pockets so as to divide the fruit carried in the pockets as they pass the abutment member, and presser fingers connected to said carriers for embracing the fruit placed in the pocket of the carriers to steady the same in its position therein, said cutter member being adjustably mounted so as to coöperate with the carriers for the severance of fruit of different sizes.

4. In a fruit pitting machine, a pair of parallel, spaced sprocket chains, a driving mechanism therefor and carriers fixed upon and between said chains and moving therewith, each having a pocket for the reception of fruit, a relatively stationary cutter and abutment member mounted in the path of movement of said pockets so as to divide the fruit carried in the pockets as they pass the abutment member, presser fingers connected to said carriers for embracing the fruit placed in the pocket of the carriers to steady the same in its position therein, and means for providing for a limited yielding movement of said cutter member.

5. In a fruit pitting machine, a pair of parallel, spaced sprocket chains, a driving mechanism therefor and carriers fixed upon and between said chains and moving therewith, each having a pocket for the reception of fruit, a relatively stationary cutter and abutment member mounted in the path of movement of said pockets so as to divide the fruit carried in the pockets as they pass the abutment member, presser fingers connected to said carriers for embracing the fruit placed in the pocket of the carriers to steady the same in its position therein, means for providing for a limited yielding movement of said cutter member, said means comprising a pivotal support for the cutter, and a spring reacting against the swinging portion of the cutter member.

6. In combination with a fruit pitting and cutting machine having movable carriers, a relatively stationary abutment, a cutting member adapted to pass centrally and between each carrier for the severance of fruit mounted therein, said member having curved, opposite knife edges and an intermediate arcuate edge portion with a surface perpendicular to the blade prongs at the central portion of said intermediate curve, the surface of the curve and prongs coöperating to form a rest for and to prevent slipping of the pit of the fruit being severed while a carrier is moving with relation to the abutment member for the removal of the pit from the fruit.

7. In combination with an inclined conveyer, and fruit carriers on the conveyer, cutting means coöperating with the carriers to cut the fruit, and means movably connected to the carriers to automatically engage the fruit to hold same on the carriers as the latter approach the cutting means and to automatically be disengaged from the fruit after the carrier passes the cutting means so as to allow the fruit to be removed from the carrier.

8. The combination in a fruit pitting and cutting machine having movable carriers, each adapted to receive a fruit to be severed and pitted, with means for moving the carriers, a cutter and abutment blade adapted to pass through the carrier, and a relatively stationary clamp comprising side jaws between which said blade is insertible and secured, and means providing for longitudinal adjustment of the blade.

9. The combination in a fruit pitting and cutting machine having movable carriers, each adapted to receive a fruit to be severed and pitted, with means for moving the carriers, a cutter and abutment blade adapted to pass through the carrier, a relatively stationary clamp comprising side jaws between which said blade is insertible and secured and adapted for longitudinal adjustment, means providing for a yielding pivotal movement of said member, including a pivot in the clamp for said member, and a yieldable support reacting upon said member to hold the same upright in the clamp.

10. The combination in a fruit pitting and cutting machine having movable carriers, each adapted to receive a fruit to be severed and pitted, with means for moving the carriers, a cutter and abutment blade adapted to pass through the carrier, a relatively stationary clamp comprising side jaws between which said blade is insertible and secured and adapted for longitudinal adjustment, means providing for a yielding pivotal movement of said member, including a pivot in the clamp for said member, and a yieldable support reacting upon said member to hold the same upright in the clamp, said member having a part engageable with a coöperative part of the clamp to limit the forward movement of said member under the reaction of the spring.

11. The combination in a machine for preparing fruit, a plurality of traveling cups lined with yieldable pads, said cups and pads being slotted, and a stationary bearing with a movable knife against which the fruit is carried, the knife passing through the cups, and a spring yieldably supporting the knife whereby it is adapted to give and coöperate with the pads for protecting soft or peeled fruit in the cups against crushing or bruising.

12. In combination with an inclined conveyer, and fruit carriers on the conveyer, cutting means coöperating with the carriers to cut the fruit, and gravity operated means connected to the carrier, which are arranged to automatically engage the fruit to hold same on the carriers as the latter approach the cutting means and to automatically drop down out of engagement with the fruit after the carrier passes the cutting means so as to allow the fruit to be removed from the carrier.

13. In combination with an endless conveyer, cutting means and a fruit carrier thereon, means coöperating with the carrier to hold the fruit on the carrier, said means automatically moving to position to engage the fruit while approaching the cutting means and after passing the cutting means automatically moving to position out of engagement with the fruit.

14. In combination with an endless conveyer, cutting means and a fruit carrier thereon, a pair of independent means coöperating with the carrier to hold the fruit on the carrier by engaging the fruit on opposite sides thereof, said means automatically moving to position to engage the fruit while approaching the cutting means and after passing the cutting means automatically moving to position out of engagement with the fruit.

15. In a fruit cutting machine, an endless conveyer having a substantially horizontal disposition, cutting means, a fruit carrier on the conveyer, and means on the conveyer to engage the fruit to hold same in the carrier, said means upon passing the cutting means and moving downward being automatically disengaged from the fruit so that upon the commencement of the upward movement of the said fruit engaging means, fruit may be placed in the carrier and upon further upward movement said fruit engaging means will automatically engage the fruit prior to the latter reaching the cutting means.

In testimony whereof I have hereunto set my hand in the presence of two subscribing witnesses.

FRANK CUTTER PHILIPS.

Witnesses:
S. L. WATTLES,
J. H. MILLER.